US006990532B2

(12) United States Patent
Day et al.

(10) Patent No.: US 6,990,532 B2
(45) Date of Patent: Jan. 24, 2006

(54) CONTEXT-SENSITIVE HELP FOR THIN CLIENT-BASED BUSINESS OPERATIONS PLATFORM

(75) Inventors: Ian Day, Toronto (CA); Elaina E. Von Haas, San Jose, CA (US)

(73) Assignee: CPA2BIZ, Inc., Jersey City, NJ (US)

( * ) Notice: Subject to any disclaimer, the term of this patent is extended or adjusted under 35 U.S.C. 154(b) by 882 days.

(21) Appl. No.: 09/828,698

(22) Filed: Apr. 7, 2001

(65) Prior Publication Data

US 2002/0147757 A1    Oct. 10, 2002

(51) Int. Cl.
*G06F 15/16* (2006.01)

(52) U.S. Cl. .................... 709/245; 709/202; 709/246; 718/1; 719/317; 719/331

(58) Field of Classification Search ............... 709/245, 709/203, 217, 219, 226, 202, 246; 711/1; 718/1; 719/331–317
See application file for complete search history.

(56) References Cited

U.S. PATENT DOCUMENTS 6,389,402 B1 * 5/2002 Ginter et al. ................. 705/51
6,587,837 B1 * 7/2003 Spagna et al. ................ 705/26
6,622,157 B1 * 9/2003 Heddaya et al. ............ 709/202
6,792,605 B1 * 9/2004 Roberts et al. ............. 719/313
6,799,214 B1 * 9/2004 Li .............................. 709/226

\* cited by examiner

*Primary Examiner*—Frantz B. Jean
(74) *Attorney, Agent, or Firm*—Richard K. Huffman; James W. Huffman

(57) ABSTRACT

An apparatus and method are provided to support the provision of context-sensitive help functions in a back-end HTML/XML server. The apparatus provides partner-sensitive help functions to users that have been redirected from a plurality of partner sites to the back-end server. The apparatus has a data base and a context-sensitive help engine. The data base stores general help data, as well as partner-specific metadata corresponding to the plurality of partner sites. The context-sensitive help engine is coupled to the data base. The context-sensitive help engine receives a help transaction request that has been redirected from a specific one of the plurality of partner sites. The context-sensitive help engine provides specific help functions in response to the help transaction request, where the specific help functions correspond to the specific partner site.

18 Claims, 12 Drawing Sheets

Back-End Context-Insensitive Help

*Partner Page for Redirection to Back-End Provider*

FIG. 7

*Sign-in Page At Back-End Provider Site*

PARTNER ALPHA — 701

The New Business Center — 701

Good News! — 701

The Partner Alpha Business Center is better than before! We have added new services and resources that will help you reduce time spent on administrative tasks and help you focus on what you do best—running your business.

704

Here are just some of the new features:
- Organize and manage tasks—yours and those you assign to others.
- Take care of virtual paperwork—expense reports, timesheets, and invoices.
- Purchase office supplies, computers, and more at discounted rates.
- Access your company's policies, procedures, and benefits information.
- Keep in touch with your coworkers with our communication tools.
- Get constantly updated news, stock quotes, and weather.
- Submit and authorize forms electronically.
- Access relevant information from industry experts.

Don't forget to bookmark this page so you can quickly return to the Business Center.

For assistance, please contact customer service at 1-888-XXXX

Sign In — 702

Company ID: 703 — Doe & Associates
User ID: John
Password: \*\*\*\*\*\*\*\*\*\*\*\*

[Sign In] [Cancel]

Forgot your password?
Not yet enrolled? Register now!

If you are returning to the Business Center but haven't logged in lately please enter the following so we can set up your Company ID and provide you immediate access to the new Business Center.

Business Center ID: _____

—AND—

Mother's Maiden Name: _____

705

700

*My Desk Applications Group Page – Partner Alpha*

Doe & Associates —802
John Doe —803

My Desk | My Company | Administration | Marketplace | Resources
Help  Site Map  Sign Out

PARTNER ALPHA —801

804 (×multiple)
805

My Calendar
Summary
Calendar
To Do
Task List
Checklists
Expense Reports
Invoices
Leave Requests
Purchase Requests
Time Sheets
My Profile
Profile Wizard
Personal Info
Work Info
Dependents
Base Pay
Additions & Deductions
W-4
Direct Deposit
Password

Highlights

Task Summary
Your console to help you manage your work.
Learn More

Checklists Manager
Choose from one of our standard business process checklists or create your own.
Learn More

Expense Reports
Stay current on your expense reports—submit them online.
Learn More

Leave Requests
Need time off? Submit leave requests online.
Learn More

Purchase Requests
Complete and submit purchase requests to your manager.
Learn More

Time Sheets
Get paid correctly and on time—fill out your timesheets online.
Learn More

Featured Services

Rate hike on your employee health insurance plan? Ask for a quote, for any state in the US.

How will your business survive an emergency? Get a quote for Property & Casualty coverage today.

40% of small businesses pay payroll tax penalties. Avoid payroll

FIG. 8

*Partner-Aware Customer Support Page - Partner Alpha*

PARTNER ALPHA — 1001

My Desk
My Company
Administration
Marketplace
Resources
Customer Support

Customer Support — 1002

Our Customer Support Team's mission is to provide our registered users with the highest level of technical support possible. We understand how valuable your time is and are committed to providing you with an exceptional level of customer service that will provide solutions and answers that will keep your business running smoothly.

Contact Us — 1004 ............................... — 1003

To contact our Customer Support Team, open the Customer Support page by clicking on the Customer Support link at the bottom of any Web page on this site and open any of the contact links available on that page. You can contact Customer Support by:

- Web: Submit a support request online.
- E-mail: Submit a support request by e-mail to support@alph.com. You will receive an immediate automated response to your e-mail. — 1005
- Chat: Chat online with a customer support representative.
- Fax: Print out a fax form and fax your support request to 408-123-4567. — 1005 Our customer support team will fax a response within an hour of your request during our normal business hours of 6 a.m. to 6 p.m. (PST). — 1005
- Phone: Call Customer Support at 877-123-4567, prompt 1, or 800-123-4567.

Customer Support hours are from 6 a.m. to 6 p.m. (PST) Monday through Friday, except holidays.

In addition, check our Frequently Asked Questions (FAQ) to see if the answer to your question has already been posted. To access our continually updated FAQ list, click on the Frequently Asked Questions (FAQ) link on the Customer Support page.

*Partner-Aware Customer Support Page - Partner Beta*

*1200*

PARTNER BETA — 1201

My Desk
My Company
Administration
Marketplace
Resources
BellSouth
Customer Support

Customer Support — 1202

Our Customer Support Team's mission is to provide our registered users with the highest level of technical support possible. We understand how valuable your time is and are committed to providing you with an exceptional level of customer service that will provide solutions and answers that will keep your business running smoothly.

If you receive an Invalid Sign In message, try the following solution: Since the Password is a case sensitive entry, try logging in again ensuring that the password is typed using the correct case. If this still does not permit entry into the site, contact your system administrator. If your system administrator is unavailable, contact Partner Beta Customer Support.

Contacts — 1203

As a registered user, you can obtain information on any of the service's features by referring to:

- Frequently Asked Questions (FAQ)
- Self-help pages which are incorporated throughout the site. Click on Help in the upper right hand corner of the Partner Beta Custom Service navigation bar to get help on a particular page's content.

Here's how to contact Partner Beta Prime Customer Support:

- E-mail support@partbeta.com.
- Fax your request to Customer Support at 888-123-YYYY
- Phone Customer Support at 888-123-ZZZZ Customer Support hours are from 7 a.m. to 7 p.m. (EST) Monday through Friday, except holidays.

FIG. 12

CONTEXT-SENSITIVE HELP FOR THIN CLIENT-BASED BUSINESS OPERATIONS PLATFORM

BACKGROUND OF THE INVENTION

1. Field of the Invention

This invention relates in general to the field of back-end application and data services, and more particularly to an apparatus and method for providing context-sensitive help functions in a back-end services platform.

2. Description of the Related Art

Computational devices have revolutionized the world of business. During earlier years, when computers were very expensive to operate and maintain, only those businesses who benefited significantly from the utilization of automated data processing techniques would allocate the necessary capital resources to provide such capabilities. During this period, computers were primarily relegated to application within scientific and data processing fields.

Today, there are literally thousands of different types of computers and even more types of application programs. In addition, the use of computers has proliferated from the scientific and data processing workplace, to less-specialized types of businesses, all the way down to the individual user at home.

During the mid 1970's, a number of successful attempts were made to interconnect computers for purposes of sharing data and/or processing capabilities. These interconnection attempts, however, employed special purpose protocols that were intimately tied to the architecture of these computers. As such, the computers were expensive to procure and maintain. The U.S. government, however, realized the power that could be harnessed by allowing computers to interconnect and thus funded research that resulted in what we now know today as the Internet. More specifically, this research provided a series of standards that specify the details of how interconnected computers are to communicate, how to interconnect networks of computers, and how to route traffic over these interconnected networks. The use of these standards allows a computer to communicate across any set of interconnected networks, regardless of the underlying native network protocols that are employed by these networks.

The ability to easily interconnect computer networks for communication purposes provided the motivation for the development of other technologies such as hypertext markup language (HTML) and extensible markup language (XML). HTML and XML allow user-friendly representations of data to be transmitted between computers. The advent of HTML-based developments has resulted in an exponential increase in the number of computers that are interconnected because, now, even home computers can access a number of services over the Internet by merely executing a single web browser application, also known as a thin web client. Microsoft® Internet Explorer® is representative of a typical thin web client. Virtually every computer produced today is sold with web client software already installed. In 1988, only 5,000 computers were interconnected via the Internet. In 1995, under 5 million computers were interconnected via the Internet. But with the maturation of client-server and HTML/XML technologies, presently, over 50 million computers access the Internet.

Since users now have computers at their businesses and at home, many service providers are now providing their particular services over the Internet. For example, users can access and pay bills online, they can do their banking online, they can order goods and merchandise online, and they can even make travel reservations online. Hence, what were once very specialized segments within the service industry are now being viewed as commodities in the eyes of the public. This viewpoint is held by consumers primarily because any number of competitors within a given service segment can easily vie for a customer's business simply by offering a better rate than all other providers in the segment. And competitors no longer have to bear the cost of salesmen and the overhead commensurate with a large sales force—one click of a hyperlink takes a potential customer right to the virtual door of a competitor's place of business.

Because competition is so easily fostered via the Internet, service providers that have traditionally offered narrow channels of service are now scrambling to keep their customer base. And rather than lower their prices and entering into the commodity realm, these service providers are opting to offer "additional" services to their online customers. Many service providers offer customers free email services. Other providers offer free online disk space for file sharing and backup. And many providers are offering a compliment of additional business services (accounting, payroll, purchasing, etc.) in addition to those specialized business services that they have traditionally offered. For example, an Internet search on the string "Small Business Center" today produces over three quarters of a million hits. It is a well-known fact in the industry that small business owners are difficult to cultivate as clients and they are difficult to keep as client. Many banks, insurance companies, payroll companies, and other traditional service providers are now attempting to provide their existing customer base with a full complement of business services.

Yet, for a single service provider to provide a full compliment of business services or other services to existing clients requires an extensive investment in talent and equipment. And rather than make such an investment, traditional service providers are opting to outsource these "additional services" to "back-end" service providers. In theory, a back-end service provider is simply an extension of the primary service provider. When a user at the primary service provider's web site elects to access additional services, the primary service provider typically redirects the user's web browser to the back-end service provider's site. Ideally, the user accesses these back-end services without sensing any change in content, format, or look-and-feel. Preferably, user should experience these additional services without sensing a change in provider sites.

Unfortunately, the ideal case has not been achieved to date, primarily because back-end service providers provide additional services for a number of primary service providers at the same time. And when these primary service providers redirect customers to back-end sites, the result is that the backwards connection to a specific referring provider is lost at all levels other than perhaps at the level where a hyperlink is provided that enables the user to return to the primary provider's site.

One particular problem area involves the provision of help functions and online help services. For example, if a user is referred (i.e., redirected) from Primary Provider A to a back-end provider, when the user executes a link at the back-end provider's site to access, say, customer support contact information, the user expects to be presented with a web page providing contact numbers and addresses for customer support offices at Primary Provider A. But because a meaningful connection with Primary Provider A has not been maintained at the back-end provider, the user is typically provided with a web page having only general purpose help information on it. Nothing on the page specifically corresponds to Primary Provider A. Moreover, any content, format, and look-and-feel of web pages that were formerly associated with a primary provider's web site are forfeited at the point where a user is redirected to the back-end site.

Such loss of continuity cultivates suspicion and reluctance on behalf of customers because they sense a disconnection between their primary service provider and the additional services that the provider allegedly offers. And client suspicion and reluctance bothers primary providers as well because clients that are reluctant to use their additional services will be more susceptible to the offers of their competitors.

Therefore, what is needed are techniques in a back-end service platform that provide help functions to redirected uses in a manner such that the identity (e.g., content, look-and-feel, etc.) of a referring primary provider is maintained.

In addition, what is needed is a back-end help apparatus that allows redirected users to experience help content and format that is specific to a referring primary service provider.

Furthermore, what is needed is a help system that allows a plurality of primary service providers to tailor help content/format at a back-end business operations platform so that users experience partner-specific help functions.

Moreover, what is needed is a method for providing provider-aware help services within a back-end business operations platform where a provider's identity is maintained throughout the session of a user who is referred to the back-end site from the provider's site.

SUMMARY OF THE INVENTION

The present invention provides a superior technique for providing context-sensitive help functions in a back-end business operations platform. According to the present invention, when a user has been directed from a particular channel partner to the back-end business operations platform, the back-end business operations platform identifies and maintains the identity of the particular channel partner. When the user subsequently initiates help transaction requests, the responses to these requests are provided using content and format that is unique to the particular channel partner.

In one embodiment, a back-end help apparatus is provided. The back-end help apparatus provides partner-sensitive help functions to users, where the users are redirected to the back-end help apparatus from a plurality of partner sites. The back-end help apparatus includes a data base and a context-sensitive help engine. The data base stores general help data, and the data base stores partner-specific metadata corresponding to the plurality of partner sites. The context-sensitive help engine is coupled to the data base. The context-sensitive help engine receives a help transaction request, where the help transaction request is redirected from one of the plurality of partner sites. The context-sensitive help engine provides specific help functions in response to the help transaction request, where the specific help functions correspond to the one of the plurality of partner sites.

One aspect of the present invention features a context-sensitive help system, for providing help functions corresponding to a plurality of partners. The context-sensitive help system has an application/web server, a data base, and a help plug-in application. The application/web server executes plug-in applications, where the plug-in applications provide services in response to transaction requests. The application/web server has entry point awareness logic, for providing an origination partner identity corresponding to a specific transaction request redirected from an origination partner. The data base is coupled to the application/web server. The data base stores general help data, and stores metadata for each of the plurality of partners, where origination partner metadata describes modifications to the general help data associated with the origination partner. The help plug-in application is coupled to the application/web server. The help plug-in application receives the origination partner identity, and modifies the general help data according to the origination partner metadata. The help plug-in application also provides the specific help functions to a user associated with the origination partner.

A further aspect of the present invention contemplates a method for providing context-sensitive help functions in a back-end applications server. The method includes first storing generalized help data corresponding to general help functions, said storing occurring in a centralized data base; second storing a plurality of metadata sets within the centralized data base, each of the plurality of metadata sets describing modifications to the generalized help data, wherein the modifications produce a plurality of specific help data sets that each correspond to each of a plurality of partners; upon receipt of a help request, identifying an origination partner; and modifying the generalized help data to produce an origination partner-specific help data set to satisfy the help request.

BRIEF DESCRIPTION OF THE DRAWINGS

These and other objects, features, and advantages of the present invention will become better understood with regard to the following description, and accompanying drawings where:

FIG. 7 is a diagram presenting a back-end sign-in page according to the present invention to which a user is directed upon executing the hyperlink of FIG. 6.

FIG. 8 is a diagram featuring a My Desk applications group page corresponding to exemplary Partner Alpha.

FIG. 10 is a diagram depicting a partner-aware customer support page corresponding to exemplary Partner Alpha.

FIG. 12 is a diagram depicting a partner-aware customer support page corresponding to exemplary Partner Beta.

DETAILED DESCRIPTION

In light of the above background describing the present day techniques available for accomplishing help functions within a back-end solutions server, related art examples will now be discussed with reference to FIG. 1. These examples clearly illustrate the limitations of present day architectures to provide anything other than generic help services for any and all channel partners that redirect user transactions to a back-end solution provider's site. More specifically, because today's back-end solution providers do not identify the source of redirected transactions when users are redirected to the back-end site, when the users execute hyperlinks (or other forms of initiation) to request help functions, the help functions that are provided consist only of nonspecific an generic functions, frequently asked questions (FAQs), and prompts. Following this discussion, a detailed description of the present invention will be provided with reference to FIGS. 2 through 12. The present invention provides a back-end solution provider architecture whereby redirected users are provided with partner-aware and context-sensitive help functions that comprises content and format that is specifically tailored for presentation according to each channel partner.

Figure 1:
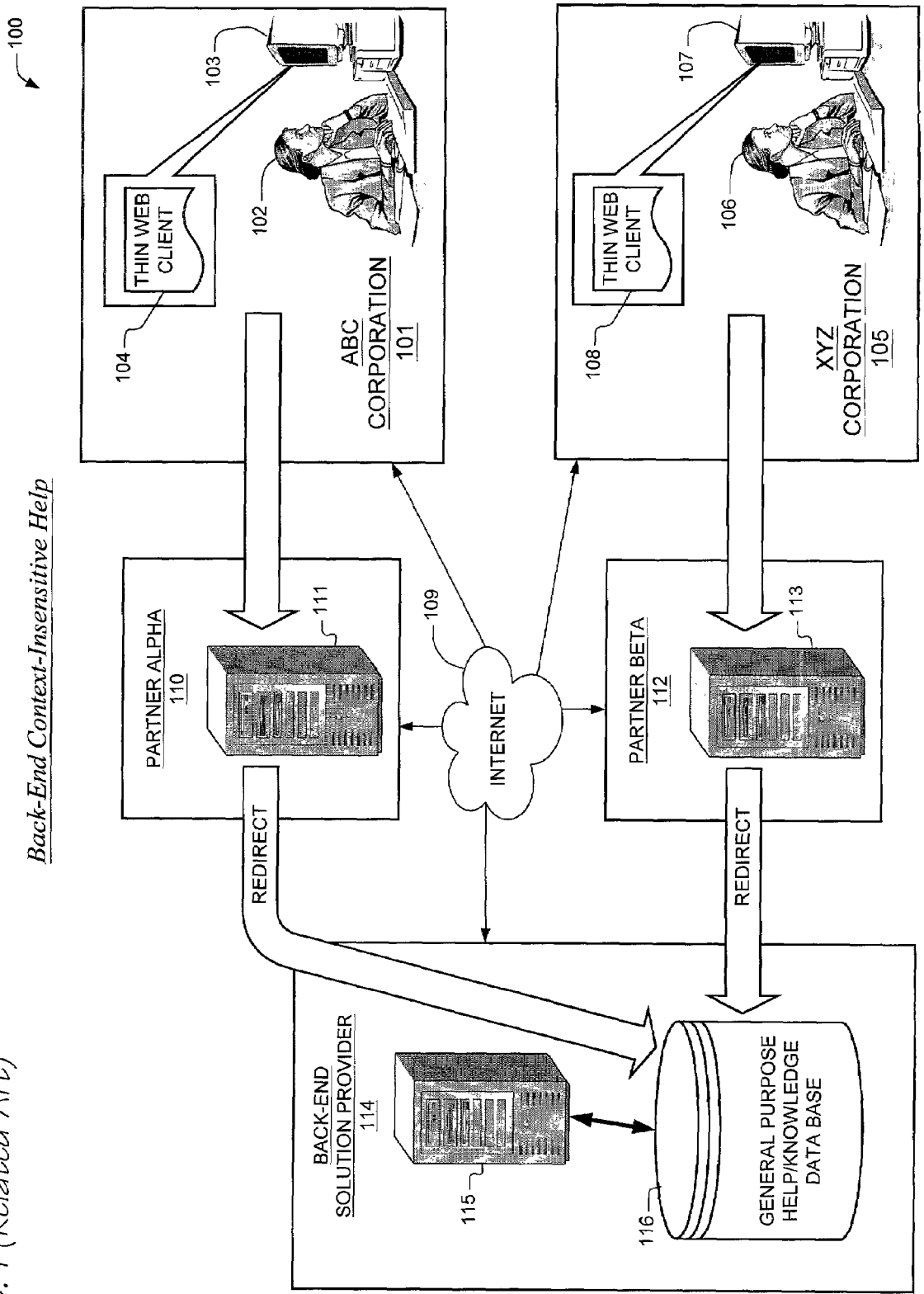
FIG. 1 is a related art diagram illustrating how help functions are accomplished within a present day back-end solution provider.

Referring to FIG. 1, a related art diagram 100 is presented illustrating how help functions are accomplished within a present day back-end solution provider. The diagram 100 depicts two users 102, 106, executing a thin web client applications 104, 108 on their respective computers 103, 107 to access services at two different partner sites 110, 112 over the Internet 109. The diagram 100 also shows a back-end solution provider site 114 that includes a back-end server 115 and a general purpose help/knowledge data base 116.

Operationally, users 102, 106 are provided with numerous types of services today by accessing application and/or web servers 111, 113 that belong to particular service providers 110, 112. The servers 111, 113 at the service providers 110, 112 are typically accessed over a data network 109. The most common data network 109 that is presently employed for providing and receiving services is the Internet 109, a collection of servers 111, 113 all over the world that utilize a common set of communication protocols (e.g., TCP/IP, HTTP, HTTPS, and FTP). The users 102, 106 access these servers 111, 113 by executing one of the more commonly found web browsers 104, 108 such as Microsoft® Internet Explorer® or Netscape® Navigator®. These web browsers 104, 108, also known as thin web clients 104, 108 provide all of the protocols and functions that a user computer 103, 107 requires to initiate and conduct transactions between the user computers 103, 107 and the servers 111, 113 at the provider sites 110, 112. Examples of the types of functions provided by service providers 110, 112 today include online banking, online travel reservations, file sharing, application downloads, secure shopping, and streaming audio/video services.

Because of today's competitive market for services, and the constant pressure from consumers to reduce the costs of services, many businesses 101, 105 have opted to outsource many of their traditionally held functions to outside service providers 110, 112. For example, consider that ABC Corporation 101 has elected to outsource payroll functions to service provider Alpha 110 and that XYZ Corporation 105 has chosen to outsource purchasing functions to service provider Beta 112. The scenario just described is typical of what one sees in the marketplace today. Alpha 110 specializes in performing payroll functions and Beta 112 specializes in purchasing. But Alpha 110 and Beta 112 are only two of the hundreds of competitors in the present day marketplace that compete for outsourced service business from corporations and small businesses. Consequently, business users 102, 106, when evaluating different providers 110, 112 to provide outsourced services, will generally select a provider 110, 112 based upon cost of services criteria alone. Therefore, it is not surprising to find that businesses 101, 105 tend to frequently change service providers 110, 112. A significant number of automated business service providers 110, 112 are now finding that customer retention, particularly for small business customers, is becoming an increasingly important issue in today's marketplace. Yet, if a service provider 110, 112 is restricted to providing automated business transaction services within a narrow service channel (e.g., banking, payroll, travel) to retain customers 101, 105, the service provider 110, 112 at this level can do nothing more than reduce the cost of services, which is a very unacceptable alternative because profit margins are negatively impacted by doing so.

A more acceptable approach taken to ensure customer retention is for a service provider 110, 112 to offer more and different automated services to the business customer 101, 105. This "integrated services" approach is most easily appreciated as one notes the great number of web sites accessible over the Internet 109 that offer free electronic mail services. For instance, most telecommunications companies have web sites that allow their customers to view and pay their bills online, while at the same time offering electronic mail and perhaps file storage services for free. It is a certain fact that a customer 101, 105, small business or otherwise, will stay with the service provider who provides the most services per dollar spent.

At the present time, the automated business services industry is in a state of flux because service providers 110, 112 have reached a point where the provision of additional channels of service to business customers 101, 105 is taxing both their expertise and their resources. To provide free electronic mail, news, and file sharing services simply involves the acquisition and maintenance of computer equipment. To provide more valuable services such as payroll, insurance, travel, accounting, and human resources, requires a very significant investment in both expertise and infrastructure, plus a long-term commitment to provide these extended services.

Just like businesses 101, 105 today have opted to outsource certain business functions to outside service providers 110, 113, many service providers 110, 112 today have chosen to outsource those additional functions that they want to provide in order to retain their existing customers 101, 105. The providers to which these additional functions are outsourced are generally referred to a back-end solution providers 114, or simply, back-end providers 114.

Functions and services provided by the back-end provider 114 are generally desired to be transparent to users 101, 105. When a service provider 110, 112 "partners" with a back-end solution provider 114 for back-end services, the partner service provider 110, 112 typically provides a means whereby customers 102, 106 can access these additional services. The most common means employed is to provide one or more hyperlinks on web pages generated by the partner servers 111, 113 that redirect users 102, 106 to the back-end solution provider server 115 so that the users 102, 106 can enjoy the additional services at the expense of the primary partners 110, 112. Hence, when a user 102, 106 executes a hyperlink on a web page provided by a partner server 111, 113 to access additional services, the user's computer 103, 107 is redirected to the back-end provider's server 115 and the current session with the primary partner 110, 112 is closed. The user 102, 106 then accomplishes those additional functions provided by the back-end server 115, and then either 1) terminates his/her online session, 2) initiates a new session with the primary partner, or 3) directs his/her thin web client 104, 108 to another site. What is significant to note is that when a user computer 103, 107 is redirected from a primary partner server 111, 113 to a back-end solution server 115, the session with the primary server 111, 113 is effectively closed and the user 102, 106 accesses the back-end provider's services distinctly from the primary partner's services. In other words, the back-end server 115 does not view, say, the user 102 from ABC Corporation 101 as a customer of Partner Alpha 110; all that the back-end server 115 notes is that there is a new transaction request from the user 102 at ABC Corporation 101.

The above-noted scenario is disadvantageous in many respects because, while a primary partner 110, 112 maintains the appearance of having provided additional services to their customers 101, 105, the substance of providing the additional services is lacking. More specifically with regard to the present application, when users 102, 106 who have been redirected to the back-end server 115 initiate certain help transaction requests (i.e., help request, etc.), they expect to be presented with help functions that comport with the content and formats provided by their primary partner 110, 112. But because the back-end provider does not discriminate transaction requests according to where partner 110, 112, what typically occurs is that users 102, 106 are provided with some generic and nonspecific form of help functions to general purpose knowledge base articles, FAQs, and the like. For example, a user 102 redirected to the back-end provider 114 from Partner Alpha 110 may want to contact Partner Alpha 110 by telephone. But when the user 102 selects a "Contact Customer Support" hyperlink provided by the back-end server 115, all that is presented to the user 102 is either 1) no useful information at all or 2) the contact numbers for all partners 110, 112 that have outsource additional services to the back-end provider 114. The provisions of such context-insensitive functions by the back-end provider 114 is viewed negatively by both users 102, 106 and by partners 110, 112.

The present invention overcomes the aforementioned limitations of present day back-end solution systems by providing an apparatus and method for supporting context-sensitive transactions. When users are redirected to a back-end provider site according to the present invention, the identity of the originating partner from which the user is redirected is retained such that subsequent help functions requested by the user are provided with content and format that comports with the originating partner. The present invention is more specifically described with reference to FIGS. 2 through 12.

Figure 2:
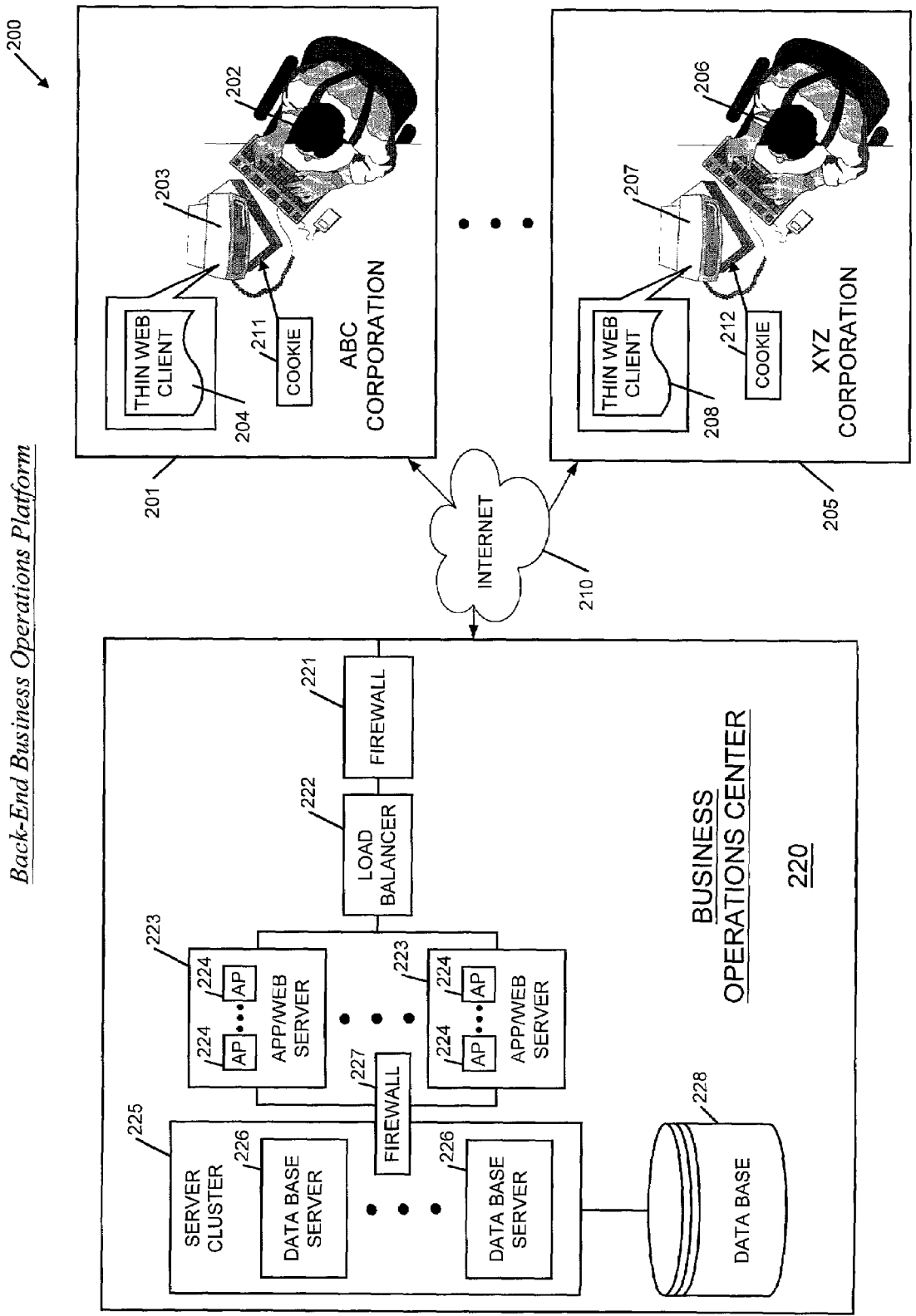
FIG. 2 is a block diagram of a back-end business operations platform in accordance with the present invention.

Referring to FIG. 2, a block diagram is presented of a back-end unified-function business operations platform 200 in accordance with the present invention. The business operations platform (BOP) 200 includes a business operations center (BOC) 220 that is accessible via a data network 210 by businesses 201, 205 executing only a thin client program 204, 208 on their computing devices 203, 207. In one embodiment, the data network 210 is the Internet and the thin clients 204, 208 are HTML/XML-based web browsers, such as Microsoft® Internet Explorer® or Netscape® Navigator®, that communicate over the Internet (i.e., the web) 210 using TCP/IP protocol. The block diagram shows two exemplary users 202, 206, one at ABC Corporation 201 and the other at XYZ corporation 205. The users 202, 206 are executing thin web clients 204, 208 on their respective computing devices 203, 207 to conduct a wide variety of business operation transactions that employ resources within the business operations center 220. The present invention contemplates that the business operations center 220 provides additional functions as a back-end solution for a plurality of primary partner sites. In one embodiment, the business operations center 220 provides traditional business services such as payroll, human resource management, accounting, in addition to context-sensitive help.

The business operations center 220 interfaces to the data network 210 via a firewall 221 configured to provide for secure access and transactions to/from the business operations center 220. Incoming transaction requests (i.e., packets) are directed from the firewall 221 to a load balancer 222. The load balancer 222 is interfaced to a plurality of application/web servers 223 and is configured to ensure that no one server 223 is overloaded with transaction requests. In one embodiment, there are two Windows NT®-based application/web servers 223 running Microsoft® Integrated Application Server Suite. Each of the application/web servers 223 includes a plurality of applications 224 that are provided for execution by users 202, 206 to accomplish certain additional services that are outsourced to the back-end system 220 by primary partners. In one embodiment, the applications 224 are Microsoft Visual Basic® applications 224. In an alternative embodiment, the applications 224 are generated using Java®. The application/web servers 223 are coupled to a data base server cluster 225 via a firewall 227. The data base server cluster 225 contains a plurality of data base servers 226. The data base server cluster 225 interfaces to a reliable, redundant, and fail-safe data base 228. In one embodiment the data base 228 is a relational data base that is interfaced by data base servers 226 executing Microsoft® SQL Server applications. In an alternative embodiment, the data base 228 is a relational data base interfaced by data base servers 226 executing ORACLE® Relational Data Base Manager applications.

In operation, the user data is stored in the data base 228 in a plurality of relational data base tables that are decoupled from specific output embodiments (i.e., display or print media) through the extensive employment of metadata in both HTML and XML files. A hierarchically established set of access privileges precludes a given user 202 from accessing data that is under the domain of another user 206. In one embodiment, the access hierarchy takes the following form: general access privileges (i.e., system administrator, technical support personnel), partner access privileges (i.e., application development and service provider partners), company access privileges (i.e., company-level administrator or company-level user), and individual access privileges (i.e., protected user objects and user customizations). In another embodiment, access privileges are more granularly determined, that is, access is granted to perform particular functions such as payroll report generation, salary access authority, etc. Hence, all of the businesses 201, 205 access data stored within the same data base 228, yet access privileges allow a user 202 from one company 201 to access only that data from another company's data set which has been enabled for directed access.

FIG. 2 provides a high-level architecture of the present invention. Multiple businesses 201, 205 employ the data base 228 to store their respective data sets and they execute applications 224 on their respective data sets to conduct transactions according to services provided by the applications 224. In one embodiment, businesses are allowed to utilize the back-end operations platform 200 for no charge;

the costs of maintaining the platform 200 are borne by partners. Individual application suppliers and partners develop "plug-in" applications 224 and partner-specific content according to each of their respective areas of expertise. A programmer-friendly applications programming interface (API) and set of development tools is provided to the developers/partners that enable customization of the operation center 220 to control access, the gamut of functions that are provided to a user 202, 206, look-and-feel, and content. In one embodiment, a plurality of XML files describe the customizations of the business operations center 220 for each of a plurality of partners. In one embodiment, cookies 211, 212 are placed on the user computers 203, 207 that identify their respective partner. Thus, when a user 202, 206 is redirected to the customized back-end operations center 220 from a particular partner site, the cookie 211, 212 is accessed by the business operations center 220 and the user 202, 206 experiences a customized set of applications, customized look-and-feel, and customized content in accordance with parameters of the XML files corresponding to the particular partner. Hence, a user 202, 206 can benefit from executing applications 224 for additional services, provided by developers/partners according to their area of specialty, that operate on a common user data set. The users 202, 206 experience is that of a virtual session to obtain additional services at a partner's site. From a partner's point of view, their metadata-tailored content/format is provided to the users 202, 206 such that the users 202, 206 obtain a consistent session experience in the presence of redirection.

Figure 3:
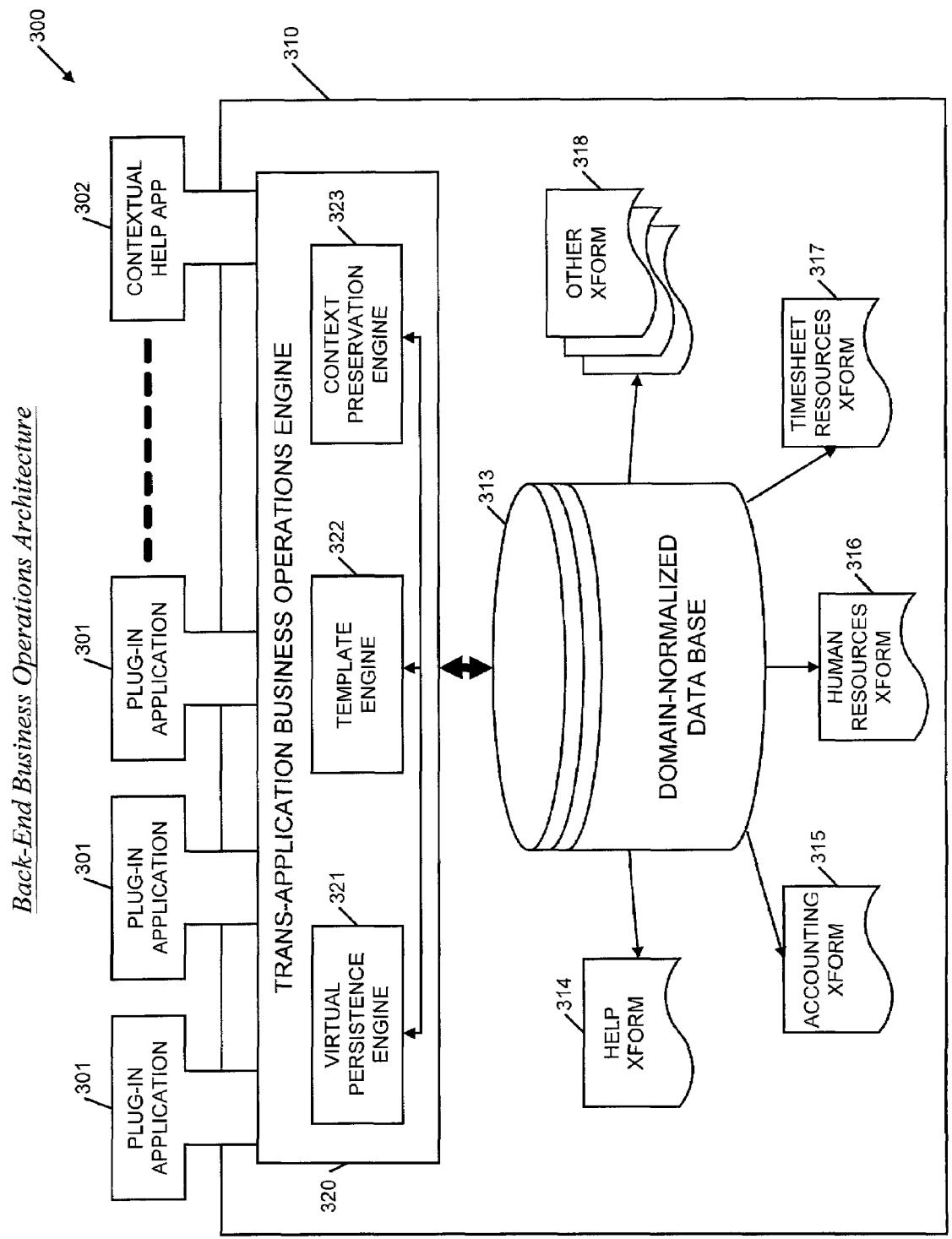
FIG. 3 is a block diagram of the back-end business operations architecture according to the present invention.

Now referring to FIG. 3, a block diagram 300 is presented illustrating the unified-function back-end operations architecture according to the present invention. The block diagram 300 depicts a plurality of plug-in applications 301, 302 operating within a multi-business enterprise operating system 310. In particular, the block diagram 300 depicts a partner-aware contextual help application 302 for providing context-sensitive help functions to users. The enterprise operating system 310 includes a multi-business domain-normalized data base 313 within which is stored domain-normalized data sets for a plurality of customers. The peculiarities of each of the customer's data sets, such as custom fields, are handled by the operating system 310 through the use of tables of metadata unique to each of the customers, thus supporting domain normalization of the data base 313. Within the data base 313, a plurality of transforms 314–318 are provided to support display and output media requirements of the plurality of plug-in applications 301, 302. In one embodiment, the transforms 314–318 are tables of metadata describing particular features of a screen view or print data. In an alternative embodiment, the transforms 314–318 are HTML files. In yet another embodiment, the transforms 314-318 are XML files. In a composite embodiment, the transforms 314–318 are a mixture of metadata tables, HTML files, and XML files. The diagram 300 depicts specific transforms such as a help function transform 314, an accounting transform 315, and etc. Specific transforms 314–318 are provided for illustrative purposes only to maintain consistency with previously discussed FIGURES. One skilled in the art will appreciate though, that the transforms 314–318 stored within the data base 313 each uniquely describe the types and format of data that are required for output by a particular plug-in application 301, 302.

The diagram 300 also illustrates a trans-application business operations engine 320 that couples the data base 313 to the plug-in applications 301, 302. The trans-application engine 320 includes a virtual persistence engine 321, a template engine 322, and a context preservation engine 323.

Operationally, the business operating system 310 is capable of executing and providing data services to any conforming plug-in application 301, 302. The plug-in applications 301, 302 provides transaction requests and receive responses from the trans-application business operations engine 320, thus insulating any plug-in application 301, 302 from specific type and syntax eccentricities of the data base 313. Within the operations engine 320, the virtual persistence engine 321 provides persistence services for any output object that is required by the application 301. In one embodiment, the persistence engine 321 caches a partially resolved set of data that results from every data base query that is expected to be performed.

The template engine 322 associates data from the data base 313 with a selected transform 314–318 for a specific output representation (e.g., the HTML/XML that displays a web page in a user's thin web client). The template engine 322 services all applications 301, 302 by using stored metadata to control the overall layout of an HTML/XML page. To provide the ability to customize a business operations platform site or help pages for a number of partners from whom user transactions are redirected, the template engine 322 includes components that construct a web page dynamically based on data stored in a metadata table. For the purposes of this application, "metadata" is a set of information, stored in the data base 313, about the presentation of the data, yet the metadata is stored separate from the data. Metadata includes information about partners' logos, specifications of which fields may be seen and/or changed by users, the look-and-feel of a particular web page, the options available to a particular user, and the content that is provided to that user.

Once the template engine 323 constructs a specific page from metadata, but before any user-specific data is rendered onto it, the specific page is cached. Any further requests by another user redirected from the same partner where the other user has with the same privileges as the first user will be filled from the cache without the performance overhead of reconstructing the page.

The context preservation engine 323 allows specific objects to change states within an application 301, 302, or to be shared between applications 301, 302 while preserving the current workflow state of that object. An object that is "workflow-enabled," is associated with a workflow state by the preservation engine 323 and the engine 323 statuses and manages the state of the object as it proceeds through its corresponding workflow states.

Figure 4:
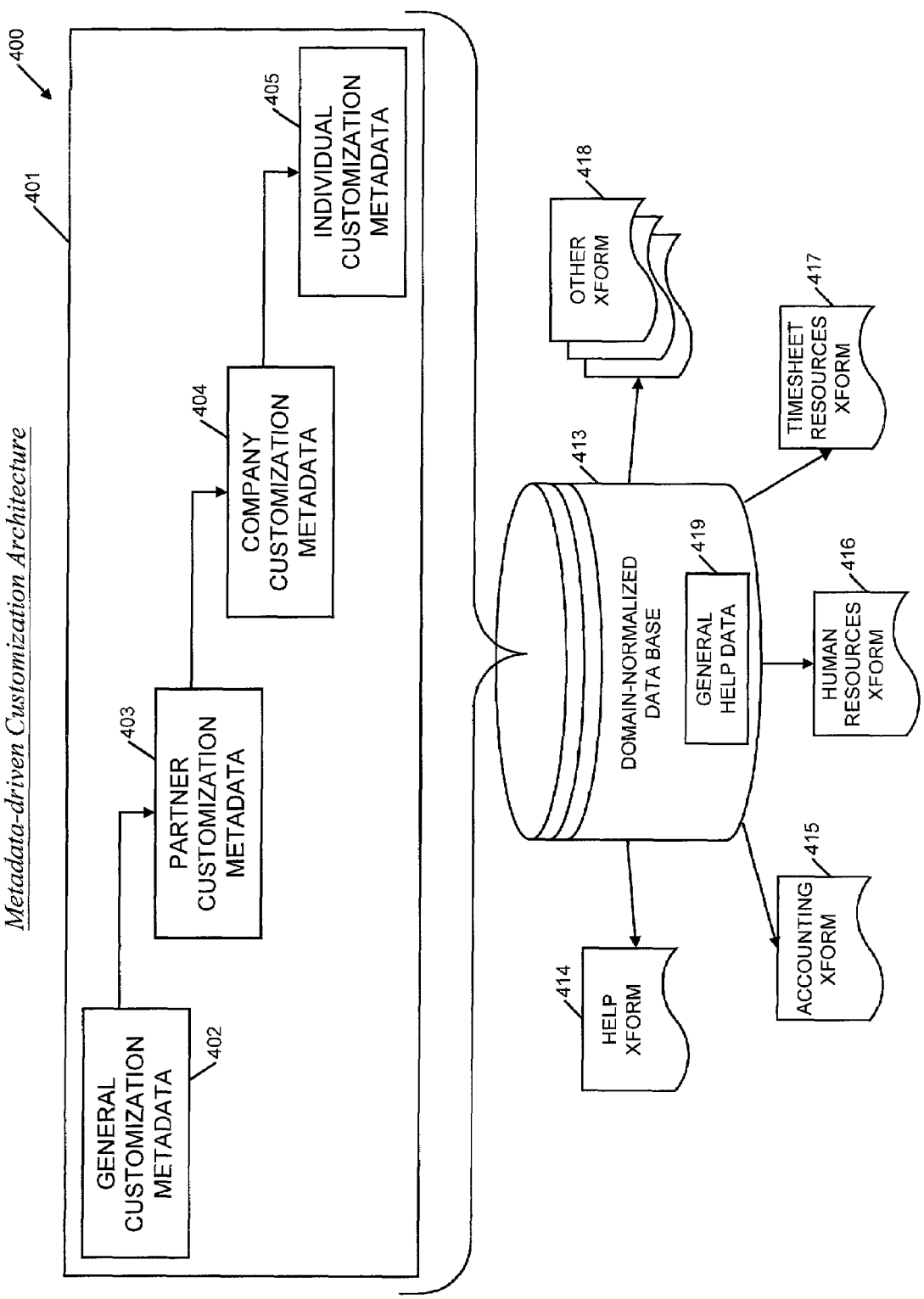
FIG. 4 is a block diagram featuring the architecture employed by the present invention for tailoring of access privileges, allowed operations, and output data according to metadata-driven hierarchical customization rules.

Now referring to FIG. 4, a block diagram 400 is presented featuring the architecture employed by the present invention for tailoring of help content/format, access privileges, allowed operations, and other content/format according to metadata-driven hierarchical customization rules. The block diagram 400 depicts a data base 413, within which is stored a generalized help data set 419, a help transform 414, an accounting transform 415, a human resources transform 416, a timesheet resources transform 417, and other transforms 418. In addition, four hierarchical sets of metadata are stored within the data base 413: general customization metadata 402, partner customization metadata 403, company customization metadata 404, and individual customization metadata 405. In addition to the hierarchical metadata 402–405, other forms of metadata are stored within the data base 413 as well like metadata that can be uniquely applied as a function of a user's industry segment or specialization.

As was previously discussed with reference to FIG. 3, the extensive employment of metadata within the data base 413 of the business operations platform enables hierarchically-established levels of customization while at the same time supporting the development of applications that "plug-in" to the architecture. At the highest level in the hierarchy, general customization metadata 402 is used to enable and disable system-wide features for the purposes of system-level administration and debug. At the next level, partner customization metadata 403 is used to configure the look-and-feel, available applications, and content that is provided to all users entering the back-end platform as a result of redirection through a given partner's site. For example, partner metadata 403 for the "Bank of XYZ" may disable any financial service applications and related help functions that are provided by any other financial service provider, thus limiting the financial services and related help choices for a user to those only provided by Bank of XYZ. Similarly, a given business administrator will provide company customization metadata 405 to enable only those output transforms 414–418 that are of interest to employees of the given business. At the individual level, individual metadata 405 is stored relating to a registered user's choices for such things as page layout, rows displayed per page, ascending/descending sort preferences, etc.

With regard to the provision of help functions, partner customization metadata 403 is applied to tailor the general help data set 419 to produce partner-specific help data sets having the content/format unique to each partner. In one embodiment, the tailoring produces a superset of the general help data 419. In an alternative embodiment, the tailoring produces a superset of the general help data 419. In a combined embodiment, the tailoring produces both supersets and subsets of the general help data 419, each set being specific to a particular one of a plurality of partners.

One skilled in the art will appreciate that privacy of data between partners, companies, and registered individuals is an issue that must be addressed within the back-end business operations platform. In one embodiment, privacy principles and practices, outside source oversight, and privacy seal processes are employed in accordance with an outside privacy certification service such as TRUSTe®.

Figure 5:
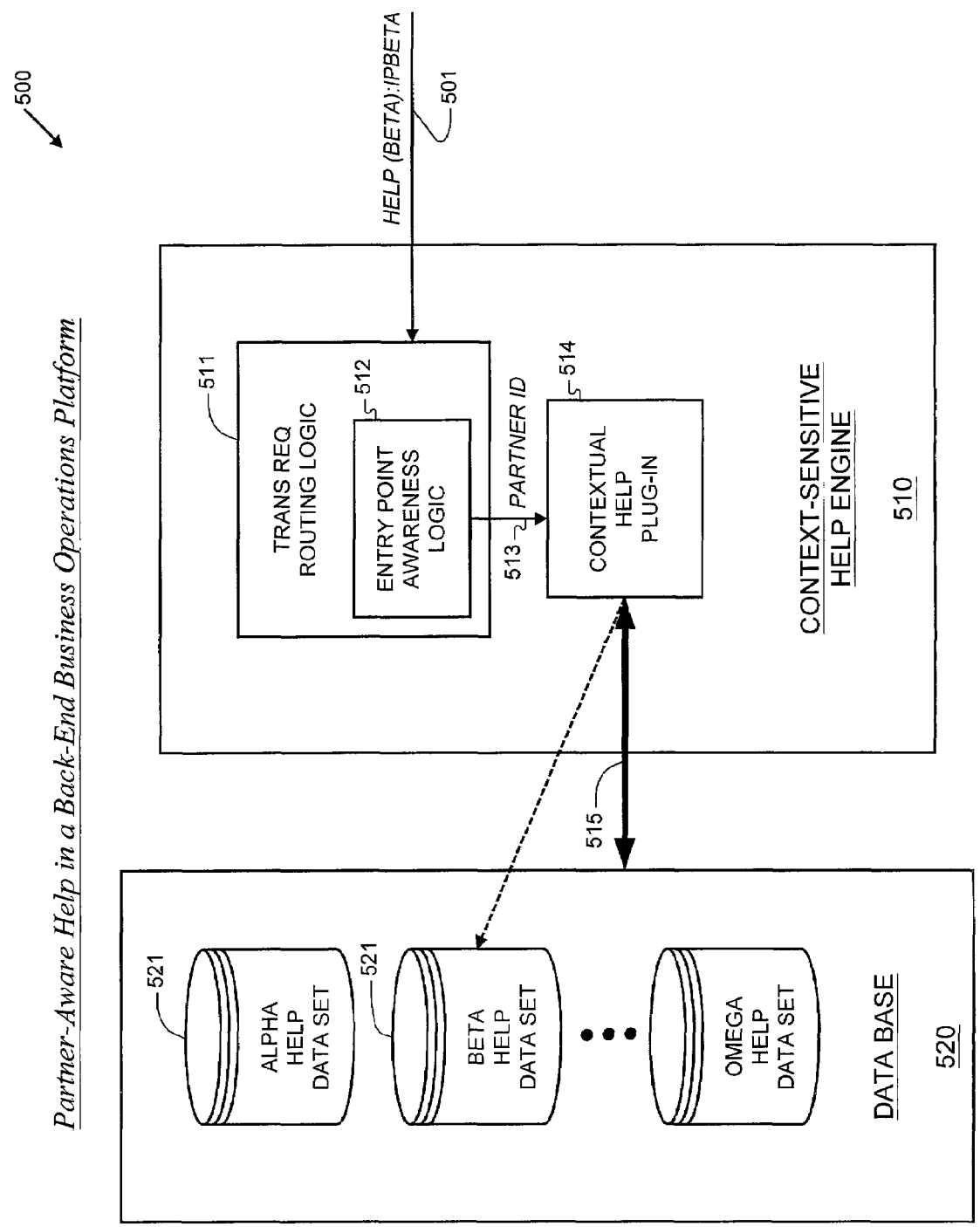
FIG. 5 is a block diagram showing how partner-aware help functions are provided in a back-end business operations platform according to the present invention.

Now referring to FIG. 5, a block diagram 500 is presented showing how partner-aware help functions are provided in a back-end business operations platform according to the present invention. The block diagram 500 depicts a context-sensitive help engine 510 executing within a back-end server according to the present invention. The help engine 510 has transaction request routing logic 511 that provides a partner ID to contextual help plug-in application 514 via bus 513. Bus 515 couples the context-sensitive help engine 510 to a data base 520 according to the present invention. The data base 520 includes a plurality of data sets 521, each corresponding to a particular partner from whose site users are redirected. The block diagram 500 also shows a help transaction request 501 being received from an exemplary partner site, partner Beta. The help transaction request 501, in a TCP/IP embodiment of the present invention, is a standard TCP/IP-based communication having an IP address, IPBETA, designating a site corresponding to partner Beta.

Operationally, entry point awareness logic 512 identifies a particular partner ID corresponding to a particular partner's site when transactions are redirected from the partner's site to the back-end operations platform. In one embodiment, the origination IP address is employed by the entry point awareness logic 512 to identify the particular partner. In an alternative embodiment, additional data is provided by the partner in the transaction request 501 that is sufficient to provide identify. In a cookie-based embodiment, the identify of the particular partner is obtained by accessing a previously-placed cookie on a user's computer.

Once the identity of the particular partner is obtained, the entry point awareness logic 512 matches the identity with a partner ID that provides for the retrieval of data/metadata corresponding to the particular partner. The entry point awareness logic 512 provides the partner ID to the contextual help plug-in 514 via bus 513. Thereafter, the contextual help plug-in 514 accesses the help data set 521 within the data base 520 that corresponds to the particular partner, partner Beta per the example shown in FIG. 5.

The back-end business operations platform according to the present invention eliminates all of the obstacles that have heretofore hampered back-end solution providers from providing a set of user-friendly, partner-tailored, and robust help functions to users entering the back-end site via redirection. In addition, the present invention overcomes prior limitations in back-end servers that heretofore have precluded the outsourced services community from fully embracing the concept of outsourced additional services. Outsource partners can now provide seamless and tailored help functions to their customers for all services that they offer, to include additional services that are outsourced to back-end service providers.

The present invention provides a development environment as well that allows service-specific application plug-ins and customizable content/format to be easily developed and integrated into the platform. Because the architecture of the trans-application operations engine isolates an application from the underlying data base and network services environment, a partner need not understand the fundamental design of the data base itself, nor how HTML/XML pages are provided to users. Their plug-in application is far removed from data base specifics and client/server problems associated with interaction over a data network. The present invention is advantageous to partners in terms of customer retention as well because the partner does not need to invest in resources or infrastructure outside of their channel-specific area of expertise in order to leverage the benefits of providing a complement of additional services to their existing and potential customers. Finally, the metadata-driven data management techniques according to the present invention provide a means whereby a recognized business partner can employ their "brand" on help content provided by the back-end platform as an incentive to encourage new clients to trust their commitment to providing long-term additional services.

Having now described the architecture and detailed design of the present invention to support generation of a partner-aware help functions in a back-end business operations platform, attention is now directed to FIGS. 6–12, wherein exemplary branded versions of the platform will now be discussed to illustrate the concept of partner-sensitive help functions. The branded versions of the platform are presented in terms of a sequence of web pages (i.e., HTML/XML generated content displayed within a hypothetical user's thin web client program). The hypothetical partners for these examples are Partner Alpha and Partner Beta.

Figure 6:
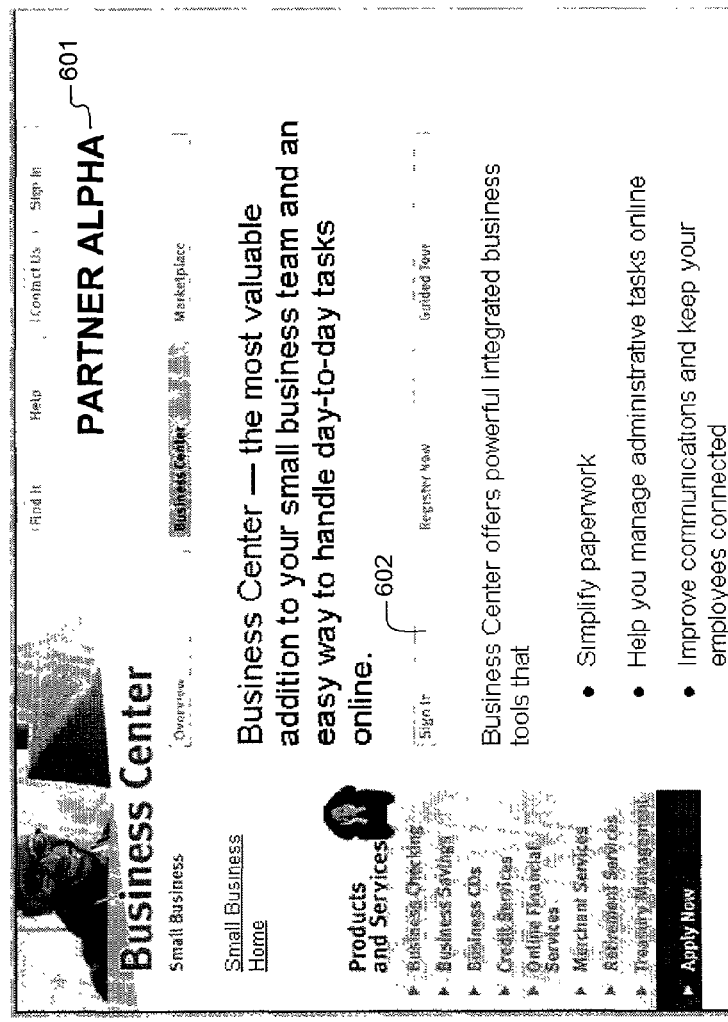
FIG. 6 is a diagram illustrating an exemplary web page at an exemplary partner site that features a hyperlink to an exemplary back-end business operations platform according to the present invention.

Now referring to FIG. 6, a diagram is shown presenting an exemplary web page 600 at an exemplary partner site (i.e., Partner Alpha) that features a hyperlink 602 to an exemplary back-end business operations platform according to the present invention. In this example, consider that Partner Alpha is an outsource service provider for individuals and businesses and that within a Partner Alpha web site, the page 600 shown in the diagram is provided when customers execute a link to obtain additional business services. A branded logo 601 on the page 600 identifies Partner Alpha as the outsource service provider and hyperlink 602 provides a redirection path to the exemplary back-end business operations platform. Assume for the purposes of illustration, that Partner Alpha is very concerned with retaining its existing customer base and has provided the link 602 in order that existing customers can seamlessly employ the additional services afforded by the back-end service provider. By clicking on the link 602, a hypothetical user, John Q. Doe, is thus redirected to the exemplary back-end business operations platform.

Following execution of the link 602, the user's web browser is redirected from Partner Alpha's server to the back-end server and the back-end server provides the user with sign-in page 700. The sign-in page 70 features partner-level content/advertisement/look-and-feel 701 that is derived from tables of partner-level customization metadata discussed above with reference to FIG. 4. The sign-in page 700 has entry fields for company ID 702, user ID 703, and password 704. Consider at this point that the user enters applicable company ID in field 702, applicable user ID in field 703, and applicable password to the back-end server in field 704. Furthermore, assume that the user executes button 705 to access the additional services provided by the back-end site on behalf of Partner Alpha.

Now referring to FIG. 8, a diagram is presented featuring a My Desk applications group page 800 corresponding to exemplary Partner Alpha as generated by a back-end server according to the present invention. The My desk page 800 provides fields 802, 803 to identify the user and the user's company ID, as well as field 801 to identify the channel partner, Partner Alpha. The My Desk page 800 also provides tab links 804 to other application groups provided by the back-end server as well as a help hyperlink 805. Assume that the user executes the help hyperlink 805.

Figure 9:
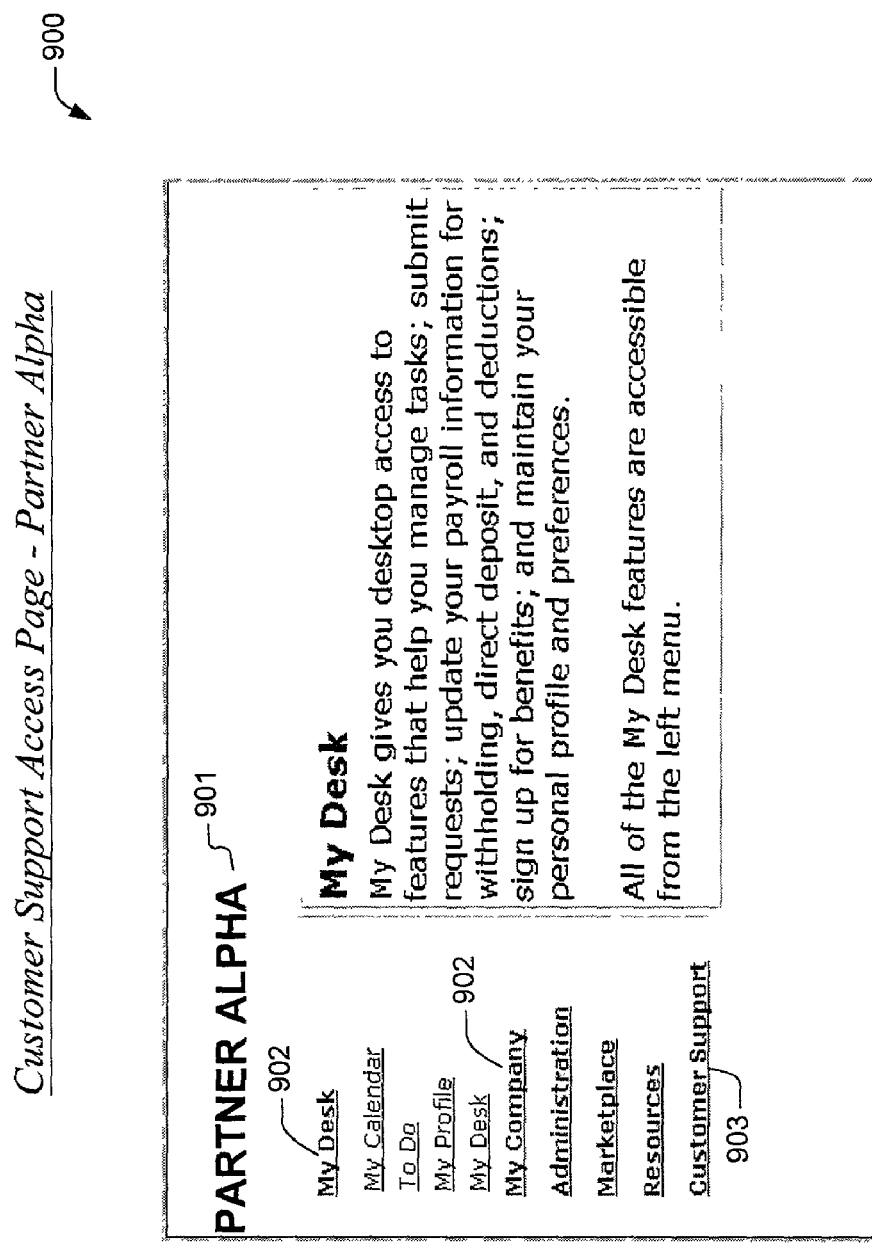
FIG. 9 is a diagram illustrating a customer support access page corresponding to exemplary Partner Alpha.

FIG. 9 is a diagram illustrating a customer support access page 900 corresponding to exemplary Partner Alpha that is provided in response to the user's execution of hyperlink 805. The access page 900 provides the user with a field 901 identifying Partner Alpha, along with hyperlinks 902, 903 for obtaining help functions for each application group provided by the back-end server. Assume that the user executes hyperlink 903 to obtain help information regarding customer support provided by Partner Alpha.

FIG. 10 is a diagram depicting a partner-aware customer support page 1000 corresponding to exemplary Partner Alpha that is provided to the user's thin web client in response to selection of hyperlink 903. The customer support page 1000 provides a partner-aware logo field 1001, partner-aware content fields 1003, 1005, and fields 1002, 1004 wherein Partner Alpha customizes look-and-feel of the page 1000. The fields 1001–1005 on the customer support page 1000 are provided as an illustration of how an exemplary partner may tailor help data in a data base according to the present invention in order to provide customers with partner-specific help data. Accordingly, one skilled in the art will appreciate that the web page 1000 of FIG. 10 is not limiting in any manner to what content/format can be provided to customers. In one embodiment, generalized help data within a data base according to the present invention can be entirely replaced by partner-specific help data.

Figure 11:
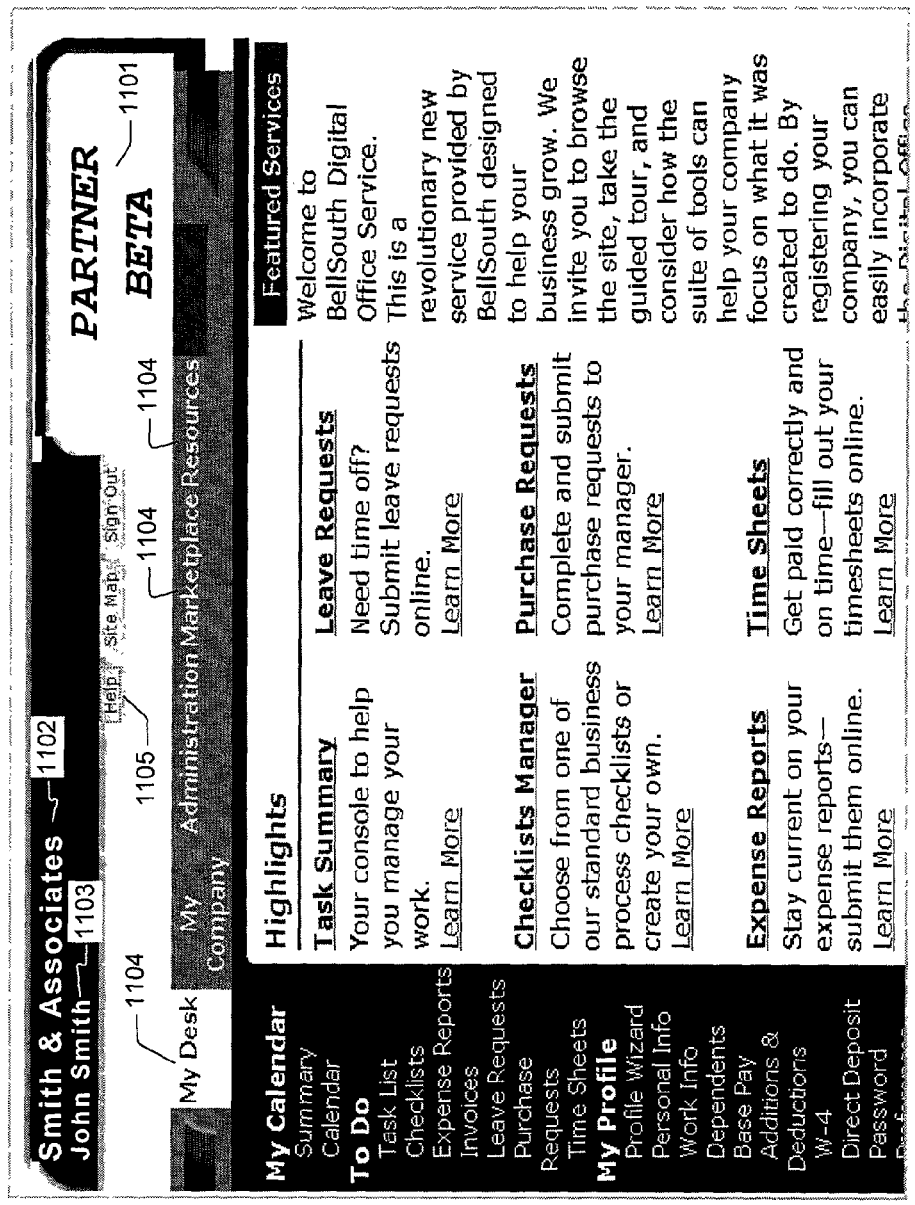
FIG. 11 is a diagram illustrating a My Desk applications group page corresponding to exemplary Partner Beta.

Now referring to FIG. 11, a diagram is presented illustrating a My Desk applications group page 1100 corresponding to exemplary Partner Beta. Assume that a different user, John Smith, has been redirected to the back-end server according to the present invention from a Partner Beta's web site. Like the My Desk applications group page 800 according to Partner Alpha, the My desk page 1100 according to Partner Beta provides fields 1102, 1103 to identify the user and the user's company ID, as well as field 1101 to identify the channel partner, Partner Beta. The My Desk page 1100 also provides tab links 1104 to other application groups provided by the back-end server as well as a help hyperlink 1105. Assume that the user executes the help hyperlink 1105.

FIG. 12 is a diagram depicting a partner-aware customer support page 1200 corresponding to exemplary Partner Beta that is provided to the user's thin web client in response to selection of hyperlink 1105. In this instance, selecting hyperlink 1105 takes the user directly to the customer support help page 1200 for Partner Beta. The customer support page 1200 provides a partner-aware logo field 1201, partner-aware content fields 1203, and a field 1202 wherein Partner Beta customizes look-and-feel of the page 1200. The fields 1201–1203 on the customer support page 1200 are provided merely to illustrate how Partner Beta may provide a partner-specific help data set that is different from that of Partner Alpha described with reference to FIG. 10.

Although the present invention and its objects, features, and advantages have been described in detail, other embodiments are encompassed by the invention as well. For example, the present invention has been particularly described in terms of help functions that are provided by a back-end business operation platform in order to provide partner-awareness to a user's help experience. The concept of partner-awareness in a back-end server, however, is not restricted to the provision of help function. One skilled in the art will appreciate that partner-awareness in a back-end server can be extended to any application or data set that is provided by the server in order to customize a user's experience such that partner-specific content/format are provided.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A back-end help apparatus, for providing partner-sensitive help functions to users, the users being redirected from a plurality of partner sites, the back-end help apparatus comprising:

a data base, configured to store general help data, and configured to store partner-specific metadata corresponding to the plurality of partner sites; and a context-sensitive help engine, coupled to said data base, configured to receive a help transaction request, said help transaction request being redirected from one of the plurality of partner sites, and configured to provide specific help functions in response to said help transaction request, wherein said help transaction request is received over a data network, and wherein said specific help functions correspond to said one of the plurality of partner sites, wherein said context-sensitive help engine comprises:

a help plug-in application, configured to execute on an application/web server within a business operations platform; and transaction request routing logic, coupled to said help plug-in application, configured to route transaction requests to a plurality of plug-in applications executing on said application/web server, wherein said transaction request routing logic identifies said one of the plurality of partner sites.

2. The back-end help apparatus as recited in claim 1, wherein said data network is the Internet.

3. The back-end help apparatus as recited in claim 1, wherein said transaction request routing logic provides the identity of said one of the plurality of partner sites to said help plug-in application along with said help transaction request.

4. The back-end help apparatus as recited in claim 3, wherein said partner-specific metadata comprises:
   first metadata, configured to describe first content/format, said first content/format corresponding to a first partner site, said first content/format comprising a first tailored version of said general help data; and
   second metadata, configured to describe second content/format, said second content/format corresponding to a second partner site, said second content/format comprising a second tailored version of said general help data.

5. The back-end help apparatus as recited in claim 4, wherein said tailored versions comprise a subset of said general help data.

6. The back-end help apparatus as recited in claim 4, wherein said tailored versions comprise a superset of said general help data.

7. A context-sensitive help system, for providing help functions corresponding to a plurality of partners, the context-sensitive help system comprising:
   an application/web server, configured to execute plug-in applications, said plug-in applications providing services in response to transaction requests, said application/web server comprising:
      entry point awareness logic, configured to provide an origination partner identity corresponding to a specific transaction request redirected from an origination partner;
      a data base, coupled to said application/web server, configured to store general help data, and configured to store metadata for each of the plurality of partners, wherein origination partner metadata describes modifications to said general help data associated with said origination partner; and
      a help plug-in application, coupled to said application/web server, configured to receive said origination partner identity, and configured to modify said general help data according to said origination partner metadata, and configured to provide said specific help functions to a user associated with said origination partner.

8. The context-sensitive help system as recited in claim 7, wherein said transaction requests are received over a data network.

9. The context-sensitive help system as recited in claim 8, wherein said data network is the Internet.

10. The context-sensitive help system as recited in claim 7, wherein said metadata comprises:
    first metadata, configured to describe first content/format, said first content/format corresponding to a first partner, said first content/format comprising a first tailored version of said general help data; and
    second metadata, configured to describe second content/format, said second content/format corresponding to a second partner, said second content/format comprising a second tailored version of said general help data.

11. The context-sensitive help system as recited in claim 10, wherein said tailored versions comprise a subset of said general customer support data.

12. The context-sensitive help system as recited in claim 10, wherein said tailored versions comprise a superset of said general customer support data.

13. A method for providing context-sensitive help functions in a back-end applications server, comprising:
    first storing generalized help data corresponding to general help functions, said storing occurring in a centralized data base;
    second storing a plurality of metadata sets within the centralized data base, each of the plurality of metadata sets describing modifications to the generalized help data, wherein the modifications produce a plurality of specific help data sets that each correspond to each of a plurality of partners;
    upon receipt of a help request, identifying an origination partner; and
    modifying the generalized help data to produce an origination partner-specific help data set to satisfy the help request.

14. The method as recited in claim 13, wherein said identifying corresponds to receipt of the help request over a data network.

15. The method as recited in claim 14, wherein said identifying corresponds to receipt of the help request over the Internet.

16. The method as recited in claim 13, wherein said second storing comprises:
    first configuring first metadata, to describe a first tailored version of the generalized help data corresponding to a first partner; and
    second configuring second metadata, to describe a second tailored version of the generalized help data corresponding to a second partner.

17. The method as recited in claim 16, wherein the tailored versions comprise subsets of the generalized help data.

18. The method as recited in claim 16, wherein the tailored versions comprise supersets of the generalized help data.

* * * * *